United States Patent
Braun et al.

(10) Patent No.: US 9,243,499 B2
(45) Date of Patent: Jan. 26, 2016

(54) GAS TURBINE ROTOR COMPRISING AN AXIALLY DISPLACEABLE TURBINE ROTOR SHAFT

(75) Inventors: Stefan Braun, Neukirchen-Vluyn (DE); Christopher Butzeck, Mülheim (DE); Jürgen Hahn, Bochum (DE); Peter Schröder, Essen (DE); Hubertus Michael Wigger, Köln (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 410 days.

(21) Appl. No.: 13/814,008

(22) PCT Filed: Jul. 20, 2011

(86) PCT No.: PCT/EP2011/062410
§ 371 (c)(1),
(2), (4) Date: Feb. 4, 2013

(87) PCT Pub. No.: WO2012/016830
PCT Pub. Date: Feb. 9, 2012

(65) Prior Publication Data
US 2013/0129478 A1   May 23, 2013

(30) Foreign Application Priority Data
Aug. 5, 2010  (EP) .................................... 10171951

(51) Int. Cl.
*F01D 5/02*  (2006.01)
*F01D 11/22*  (2006.01)
*F16D 1/10*  (2006.01)

(52) U.S. Cl.
CPC ................ *F01D 5/026* (2013.01); *F01D 11/22* (2013.01); *F16D 1/101* (2013.01); *F05D 2260/37* (2013.01); *F16D 2001/103* (2013.01)

(58) Field of Classification Search
CPC ......... F01D 5/026; F01D 11/22; F16D 1/101; F16D 2001/103; F05D 2260/37
See application file for complete search history.

(56) References Cited

U.S. PATENT DOCUMENTS

| | | |
|---|---|---|
| 4,639,194 A | 1/1987 | Bell, III |
| 5,282,358 A | 2/1994 | Schilling |

(Continued)

FOREIGN PATENT DOCUMENTS

| | | |
|---|---|---|
| CA | 1126168 A1 | 6/1982 |
| CN | 101144507 A | 3/2008 |
| EP | 1900951 A1 | 3/2008 |
| FR | 2918726 A1 | 1/2009 |

(Continued)

*Primary Examiner* — Igor Kershteyn

(57) ABSTRACT

A gas turbine rotor for a gas turbine is provided. The gas turbine rotor includes a compressor rotor shaft, a turbine rotor shaft and a coupling device frictionally connecting the two rotor shafts, wherein the coupling device is designed in such a way that the friction connection also exists when the two rotor shafts are displaced relative to one another. In this case, the turbine rotor shaft is lengthened at the end facing the compressor rotor shaft in such a way that the turbine rotor shaft overlaps with the compressor rotor shaft in the axial direction and the coupling device connects this lengthened end of the turbine shaft to the compressor rotor shaft in the radial direction.

10 Claims, 2 Drawing Sheets

(56) References Cited

U.S. PATENT DOCUMENTS

| | | | | |
|---|---|---|---|---|
| 5,533,825 | A | * | 7/1996 | Stone .................. F01D 5/026 403/359.6 |
| 5,580,183 | A | * | 12/1996 | Brackoneski ........... F01D 5/026 415/216.1 |
| 6,827,548 | B2 | * | 12/2004 | Coxhead ................ F01D 21/02 415/9 |
| 7,736,083 | B2 | * | 6/2010 | Lescure ................. F01D 5/026 416/244 A |
| 8,152,438 | B2 | * | 4/2012 | Servant ............... F01D 25/162 415/216.1 |
| 2008/0124168 | A1 | | 5/2008 | Lescure |
| 2008/0247865 | A1 | | 10/2008 | Fiala |

FOREIGN PATENT DOCUMENTS

| | | |
|---|---|---|
| GB | 658778 A | 10/1951 |
| JP | 3011129 A | 1/1991 |
| JP | 0610701 | 1/1994 |
| JP | 3032135 U | 12/1996 |
| JP | 2002201901 A | 7/2002 |
| JP | 2008057541 A | 3/2008 |
| JP | 2008133830 A | 6/2008 |
| JP | 2008157237 A | 7/2008 |

* cited by examiner

GAS TURBINE ROTOR COMPRISING AN AXIALLY DISPLACEABLE TURBINE ROTOR SHAFT

CROSS REFERENCE TO RELATED APPLICATIONS

This application is the US National Stage of International Application No. PCT/EP2011/062410, filed Jul. 20, 201 and claims the benefit thereof. The International Application claims the benefits of European application No. 10171951.6 EP filed Aug. 5, 2012. All of the applications are incorporated by reference herein in their entirety.

FIELD OF INVENTION

The invention relates to a gas turbine rotor, to a corresponding gas turbine and also to corresponding rotor shafts for the compressor and the turbine of such a gas turbine.

BACKGROUND OF INVENTION

In addition to one or more combustion chambers, gas turbines comprise substantially a compressor and a downstream turbine, which are connected by way of a common rotor shaft in the axial direction. As with any machine for generating energy, the highest possible efficiency, i.e. the ratio of generated to used energy, is a significant factor.

The method known as hydraulic gap optimization, as described in EP 1 131 537 B1, is therefore used in gas turbines in order to optimize the overall efficiency of the gas turbine. In this case, the gas turbine rotor is displaced counter to the direction of flow of the hot gas in order to minimize, in the case of a conically configured hot gas passage, the radial gap between the rotor blade tips and the wall of the hot gas passage. In this case, the tie bolt, which connects the turbine rotor to the compressor rotor, is mounted in such a way that it can be displaced in the axial direction. As a result, the turbine gaps can be displaced for optimization to the benefit of the efficiency of the turbine. At the same time, however, the radial compressor gaps are also misaligned to the detriment of the efficiency of the compressor by the associated displacement of the compressor rotor. In order to avoid this contrary effect and thus to further optimize the overall efficiency, it has already been envisaged to separate the common rotor at the interface between the compressor and the turbine and to couple the two rotor parts in a force-fitting manner by way of an axial coupling. The coupling in this respect has to be designed in such a way, however, that the force fit is also present upon axial displacement of the turbine rotor shaft, in relation to the compressor rotor shaft. It is thus possible to displace the turbine rotor and thus optimize the efficiency thereof without it being necessary to displace the compressor rotor at the same time. An increase in the efficiency of the turbine by hydraulic gap optimization thus no longer simultaneously brings about an impairment of the efficiency of the compressor, which would counteract the actual aim.

Furthermore, it is known from GB 658 778 A to configure the compressor rotor portion so as to be axially displaceable in relation to a turbine rotor portion in a gas turbine rotor. To this end, the two rotor portions are connected to one another in the manner of a plug and socket coupling. This has the disadvantage that three radial bearings are required for supporting the two rotor portions.

SUMMARY OF INVENTION

It is an object of the invention to provide a further improved gas turbine rotor for a gas turbine.

This object is achieved by a gas turbine rotor for a gas turbine, comprising a compressor rotor shaft, a turbine rotor shaft which can be displaced axially in relation to the compressor rotor shaft and also a coupling device which constantly connects the two rotor shafts, wherein the compressor rotor shaft is designed as a hollow shaft through which the turbine rotor shaft is guided.

The lengthening of the turbine rotor shaft beyond the entire axial length of the compressor rotor shaft provides a particularly large contact face for the coupling device and thus the transmission of torque from the turbine rotor to the compressor rotor. If the compressor rotor shaft is designed as a hollow shaft, the lengthened end of the turbine rotor shaft is guided through it, such that both rotor shafts in the gas turbine have a common axis. If the coupling device is split into two regions located at the two ends of the compressor rotor shaft, there is a particularly robust coupling device.

If two bearings, one for the axial positioning of the compressor rotor shaft and one for the axial positioning of the turbine rotor shaft, are provided in the gas turbine, both the compressor rotor and the turbine rotor can be displaced independently of one another with respect to the gas turbine housing. The gap optimization can thus be effected for both parts—the turbine and the compressor—separately from one another, such that an optimum overall efficiency of the gas turbine can be achieved. Losses in efficiency in the compressor, which arise on account of axial displacement to the benefit of the efficiency of the turbine in the case of known rigid couplings between the two shafts, can thus be avoided. By combining the embodiment according to the invention of the two rotor shafts and the coupling device with the two bearings for axial displacement, it is thus possible for gap optimization to be effected in the compressor and also in the turbine independently of one another, without the mode of operation of the gas turbine rotor being restricted. By such an individual adjustment, the gas turbine can also be operated in an extended operating range, for example partial load or hot starting. Particularly in the case of hot starting, it may thus be necessary even to increase the size of the gaps, in order to prevent the compressor blades from brushing against the housing in this critical state.

BRIEF DESCRIPTION OF THE DRAWINGS

The invention will now be explained by way of example with reference to the figures which follow, in which.

DETAILED DESCRIPTION OF INVENTION

Figure 1:
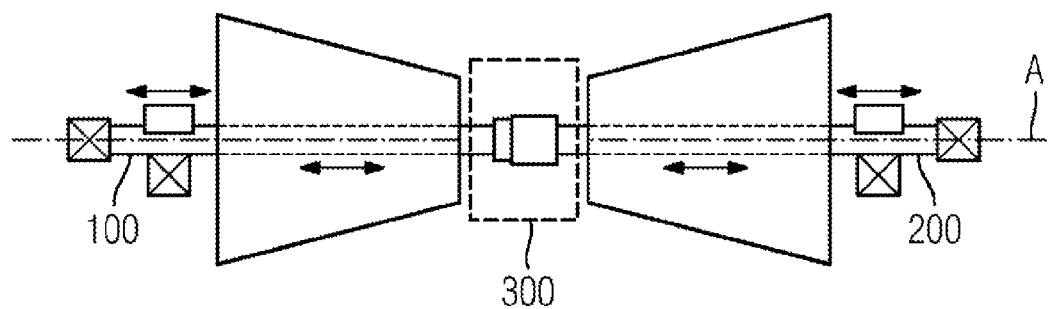
FIG. 1 schematically shows a known gas turbine rotor of a gas turbine.

The known gas turbine rotor for a gas turbine as shown schematically in FIG. 1. The gas turbine comprises, in addition to a combustion device 1 for generating hot gas, a compressor 10 having a compressor rotor shaft 100, a turbine 20 having a turbine rotor shaft 200 and a force-fitting coupling device 300 between the compressor rotor shaft and the turbine rotor shaft. The two rotor shafts 100 and 200 are mounted by way of appropriate bearings (schematically indicated) in such a way as to make axial displacement of both rotor shafts possible. The coupling 300 is in this case formed in such a way that the force fit is also always present when the two rotor shafts are displaced in a defined manner together or in relation to one another.

Figure 2:
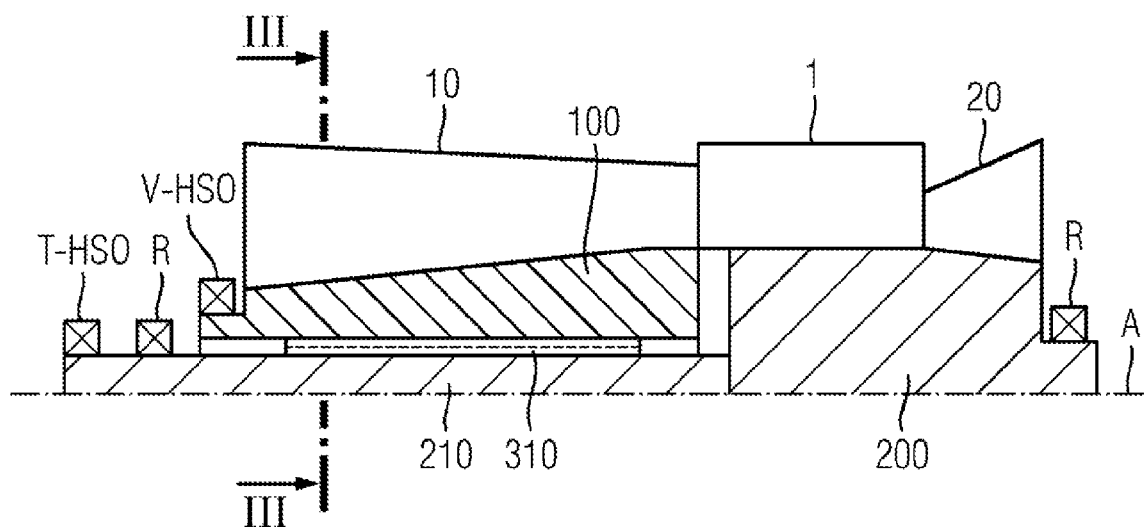
FIG. 2 schematically shows a first embodiment according to the invention of the coupling device.

FIG. 2 schematically shows a first concrete embodiment of the gas turbine rotor according to the invention. The rotor shaft 200 of the turbine 20 is here lengthened to such an extent in the direction of the compressor 10 that the lengthened end 210 completely overlaps the compressor rotor shaft 100. This lengthened turbine rotor shaft 200 is mounted radially in a known way by way of bearings R merely indicated here. In addition, an axial bearing T-HSO is provided for axial displacement of the turbine rotor shaft 200 for the purpose of hydraulic gap optimization in the turbine 20. In the exemplary embodiment shown here, the compressor rotor shaft 100 is designed as a hollow shaft, which additionally has an axial bearing V-HSO for axial displacement of the compressor rotor shaft 100 for the purpose of hydraulic gap optimization in the compressor 10. Since the turbine rotor shaft 200 is lengthened beyond the compressor rotor shaft 100, the coupling device 300 can be formed extensively over the circumference of the lengthened turbine rotor shaft section 210. The lengthened turbine rotor shaft section 210 thus here likewise forms the radial bearing for the compressor.

The two axial bearings T-HSO and V-HSO are in this case arranged at the cold, inflow end of the compressor 10. With the aid of the two axial bearings T-HSO, V-HSO, it is possible to position the two rotor shafts 100, 200 independently of one another and to displace them independently of one another.

Figure 3:
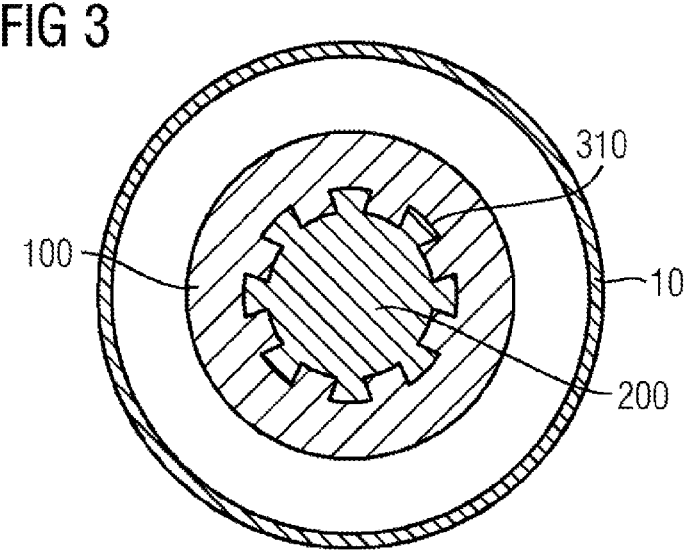
FIG. 3 shows a section through the exemplary embodiment shown in FIG. 2, FIG. 4 schematically shows a second exemplary embodiment.

As can be seen with reference to the section through the gas turbine rotor as shown in FIG. 3, the coupling device may be formed, for example, as a splined shaft connection 310. One splined shaft rim of the splined shaft connection 310 here extends over an inner face of the compressor rotor shaft 100 formed as a hollow shaft, and the second splined shaft rim, corresponding to the first splined shaft rim, extends over the outer face of the lengthened end 210 of the turbine rotor shaft 200. Both splined shaft rims here engage into one another in such a way that the force-fitting coupling between the compressor rotor shaft 100 and the turbine rotor shaft 200 is ensured. For better understanding of the arrangement inside the gas turbine, FIG. 2 and FIG. 4 indicate the compressor 10 as a convergent flow duct and the turbine 20 as a divergent flow duct, in which the rotor blades arranged on the rotor shafts are located.

Figure 4:
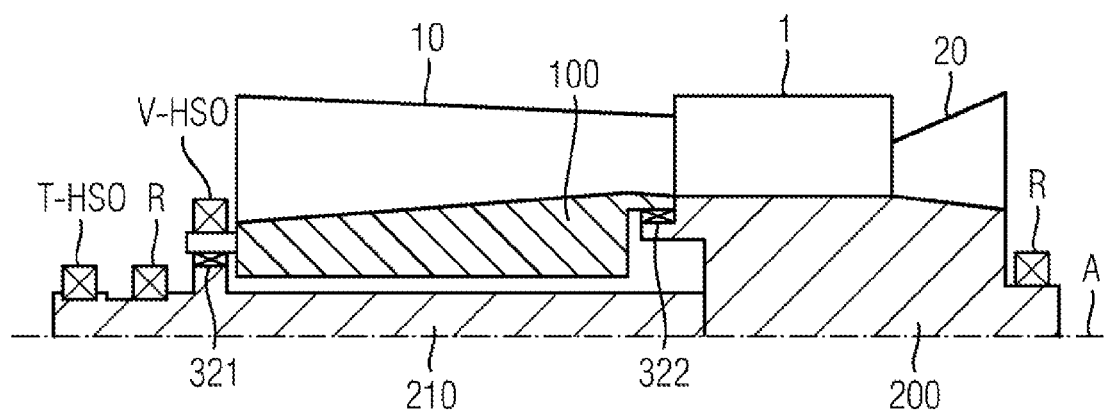

FIG. 4 shows an alternative embodiment, in which the coupling device is split into two regions 321 and 322 on the two sides of the compressor rotor shaft 100. The interlocking and therefore the force-fitting coupling between the compressor rotor shaft 100 and the turbine rotor shaft 200 may in this case also be formed as shown in FIG. 3. Apart from that, it has the same features as the embodiment shown in FIG. 2.

The present invention is not limited to the embodiments described above. Instead, combinations of, modifications to or additions to individual features, which may lead to further possible embodiments of the inventive concept, are also conceivable. Thus, for example, the compressor rotor shaft could also be lengthened in a suitable way and engage into a turbine rotor shaft formed as a hollow shaft. Additionally, the coupling devices of the two embodiments shown could be combined in order to achieve an even better transmission of torque. It is always essential here that the gas turbine rotor according to the invention is formed in such a way that, in the case of hydraulic gap optimization, the losses in efficiency in the compressor are not increased, and may even be improved by separate displacement of the compressor 10. It would thus be possible to achieve an additional gain in efficiency and an extended operating range of the gas turbine as a whole by such separate gap optimization on the part of the compressor beyond the normal state. By virtue of the separate displacement of the compressor and the turbine in relation to the housing of the gas turbine and the separate gap optimization thus achieved, the gas turbine can be adapted to the respective flow state and therefore can also be used in partial load operation.

The invention claimed is:

1. A gas turbine rotor for a gas turbine, comprising:
   a compressor rotor shaft;
   a turbine rotor shaft displaced axially in relation to the compressor rotor shaft; and
   a coupling device which constantly connects the compressor rotor shaft with the turbine rotor shaft,
   wherein the compressor rotor shaft is a hollow shaft through which the turbine rotor shaft is guided, such that it completely overlaps the compressor rotor shaft.

2. The gas turbine rotor as claimed in claim 1,
   wherein the coupling device is a splined shaft connection, one splined shaft rim of which extends in the circumferential direction over an inner face of the compressor rotor shaft formed as a hollow shaft, and the second splined shaft rim of which, corresponding to the first splined shaft rim, extends in the circumferential direction over the outer face of the lengthened end of the turbine rotor shaft.

3. The gas turbine rotor as claimed in claim 1
   wherein the coupling device comprises two regions for connecting the compressor rotor shaft and the turbine rotor shaft in a force-fitting manner, and
   wherein the first region is located at one end of the compressor rotor shaft and the second region is located at the second end of the compressor rotor shaft.

4. The gas turbine rotor as claimed in claim 2
   wherein the coupling device comprises two regions for connecting the compressor rotor shaft and the turbine rotor shaft in a force-fitting manner, and
   wherein the first region is located at one end of the compressor rotor shaft and the second region is located at the second end of the compressor rotor shaft.

5. The gas turbine rotor as claimed in claim 1,
   wherein the compressor rotor shaft is a hollow shaft through which the turbine rotor shaft is guided, such that it completely overlaps the compressor rotor shaft and provides a common axis for the compressor rotor shaft and the turbine rotor shaft.

6. A gas turbine, comprising:
   a compressor;
   a turbine; and
   a gas turbine rotor as claimed in 1, in which the turbine rotor shaft is mounted radially.

7. The gas turbine as claimed in claim 6, further comprising:
   a first axial bearing is provided for axial positioning of the compressor rotor shaft; and
   a second axial bearing is provided for the axial positioning of the turbine rotor shaft.

8. The gas turbine as claimed in claim 7,
   wherein the first axial bearing and the second axial bearing are arranged at an inflow end of the compressor.

9. A compressor rotor shaft for a gas turbine, which is formed as a hollow shaft in such a way that it is used as part of a coupling device in a gas turbine rotor as claimed in claim 1.

10. A turbine rotor shaft for a gas turbine, which is lengthened at one end in such a way that it is used as part of a coupling device in a gas turbine rotor as claimed claim 1.

* * * * *